United States Patent [19]

Hannen et al.

[11] Patent Number: 5,425,464
[45] Date of Patent: Jun. 20, 1995

[54] PALLETIZING APPARATUS

[75] Inventors: Reiner W. Hannen, Coch 2 -Pfalzdorf; Nobert P. Vermeulen, Kleve-Warbeyen, both of Germany

[73] Assignee: MSK-Verpackungs-Systeme Gesellschaft mit Beschrankter Haftung, Kleve, Germany

[21] Appl. No.: 80,213

[22] Filed: Jun. 18, 1993

[30] Foreign Application Priority Data

Jun. 19, 1992 [DE] Germany .................. 9208192 U

[51] Int. Cl.⁶ ............................................. B66C 23/72
[52] U.S. Cl. ..................................... 212/197; 212/323; 212/333; 187/404
[58] Field of Search ............... 414/281, 560, 561, 673; 212/213, 214, 215, 216, 217, 128, 129, 130, 196, 197, 198; 187/94, 404

[56] References Cited

U.S. PATENT DOCUMENTS

| 801,305 | 10/1905 | Deachman | 212/196 |
|---|---|---|---|
| 2,872,050 | 2/1959 | Norwood | 212/197 |
| 2,876,959 | 3/1959 | Lamb et al. | 414/673 |
| 4,538,954 | 9/1985 | Luebke | 414/673 |
| 4,634,333 | 1/1987 | Batterly et al. | 187/404 |

FOREIGN PATENT DOCUMENTS

| 408338 | 9/1923 | Germany | 212/197 |
|---|---|---|---|
| 501247 | 6/1930 | Germany | 414/673 |
| 3528791 | 2/1987 | Germany | 414/281 |

Primary Examiner—Michael S. Huppert
Assistant Examiner—Thomas J. Brahan
Attorney, Agent, or Firm—Herbert Dubno

[57] ABSTRACT

A palletizing apparatus has a horizontally displaceable carriage movable on a horizontal member of a frame. A counter-weight is received in one or each of a pair of uprights and is connected via a cogged belt to the lifting slider which is provided with a deflecting roll or pulley about which the belt passes. The support member or lift slider carries the pickup head. The drive for the horizontal movement of the carriage thus does not have to displace the counterweight or counterweights which are provided to balance the weight of the lifting slider and the load.

2 Claims, 2 Drawing Sheets

PALLETIZING APPARATUS

FIELD OF THE INVENTION

Our present invention relates to a palletizing apparatus of the type in which a pickup head is vertically and horizontally displaceable so as to be able to pick up an article, object or group of articles or objects from one location and deposit them at another location, e.g. on a pallet. More particularly the invention relates to a palletizing apparatus for that purpose which has a frame with vertical frame members or uprights and horizontal frame members or traverses connecting these uprights, a carriage horizontally displaceable on the frame, and a vertically-movable lifting slide, carrying the tool pickup head, whereby the lifting slide is connected with a counterweight.

BACKGROUND OF THE INVENTION

In the palletizing of pieces to be stacked upon the pallet, relatively large loads must be transported on comparatively short paths, requiring these loads to be rapidly lifted and lowered and displaced back and forth.

Because of the short path, it is difficult to achieve high speeds because time is required for acceleration and deceleration.

A harmonic low-wear process can only be obtained if the weight is at least partly balanced. For that purpose the lifting slide, which engages the workpieces via the tool pickup head, is connected with a counterweight.

In the customary palletizing apparatus with respect to which the present invention is an improvement, the counterweight is provided on the lifting slide. As a consequence not only is the counterweight moved during the vertical movement of the lifting slide, but the weight of the load and the counterweight must be disclosed whenever the slide and carriage are horizontally shifted. The drive of the carriage, therefore, must be dimensioned to accommodate the load of the counterweight and the acceleration, movement and deceleration thereof.

The weight contributed by the counterweight increases the wear of the components, requires installation of higher drive capacity and accounts for a corresponding increase in the energy consumption of the apparatus.

OBJECTS OF THE INVENTION

It is, therefore, the principal object of the present invention to provide an improved palletizing apparatus which allows the weight which must be accelerated, moved and decelerated in the operation of the system to be greatly reduced.

Another object of the invention is to provide a palletizing apparatus which can utilize drives of smaller capacity than have been required heretofore.

It is also an object of this invention to provide a palletizing apparatus which is more economical and efficient to use than earlier apparatus and which suffers less wear than earlier systems.

It is yet a further object of this invention to provide an improved palletizing apparatus which is free from the drawbacks of earlier arrangements.

SUMMARY OF THE INVENTION

These objects and others which will become apparent hereinafter are attained, in accordance with the invention, by providing the lifting slide with a deflection roll for a traction element which is guided also over additional rolls mounted on the frame and which has one end fastened to a counterweight. The counterweight is guided on the frame rather than on the carriage. Since the counterweight no longer is required to undergo horizontal movement with the carriage, the latter can be lighter and requires less energy in use.

For the vertical drive of the lifting slide, one of the deflection rolls on the frame can be formed as a drive roll for the traction element and provided, for that purpose, with a drive. To ensure reliable transmission of the drive force, the traction element can be formed as a cog or toothed belt and a form-fitting connection between the cogged belt and the drive roll can be provided by making the latter as a toothed roll whose teeth fit snugly between the cogs of the belt.

Preferably the drive roll is so positioned that the belt extends around the cogged roll through 180°. According to a feature of the invention, one end of the traction element is affixed to the frame at one side thereof, e.g. at a location at the corresponding end of the travel of the carriage while the counterweight is guided in the hollow of an upright at the other side of the frame. The counterweight is here protected against interference. The carriage can be moved the full length of the traverse without the counterweight having to be moved correspondingly.

According to another embodiment of the invention, both ends of the traction element can be connected to counterweights and guided over respective drive rollers.

BRIEF DESCRIPTION OF THE DRAWING

The above and other objects, features and advantages of the invention will become more readily apparent from the following description, reference being made to the accompanying highly diagrammatic drawing in which.

SPECIFIC DESCRIPTION

Figure 1:
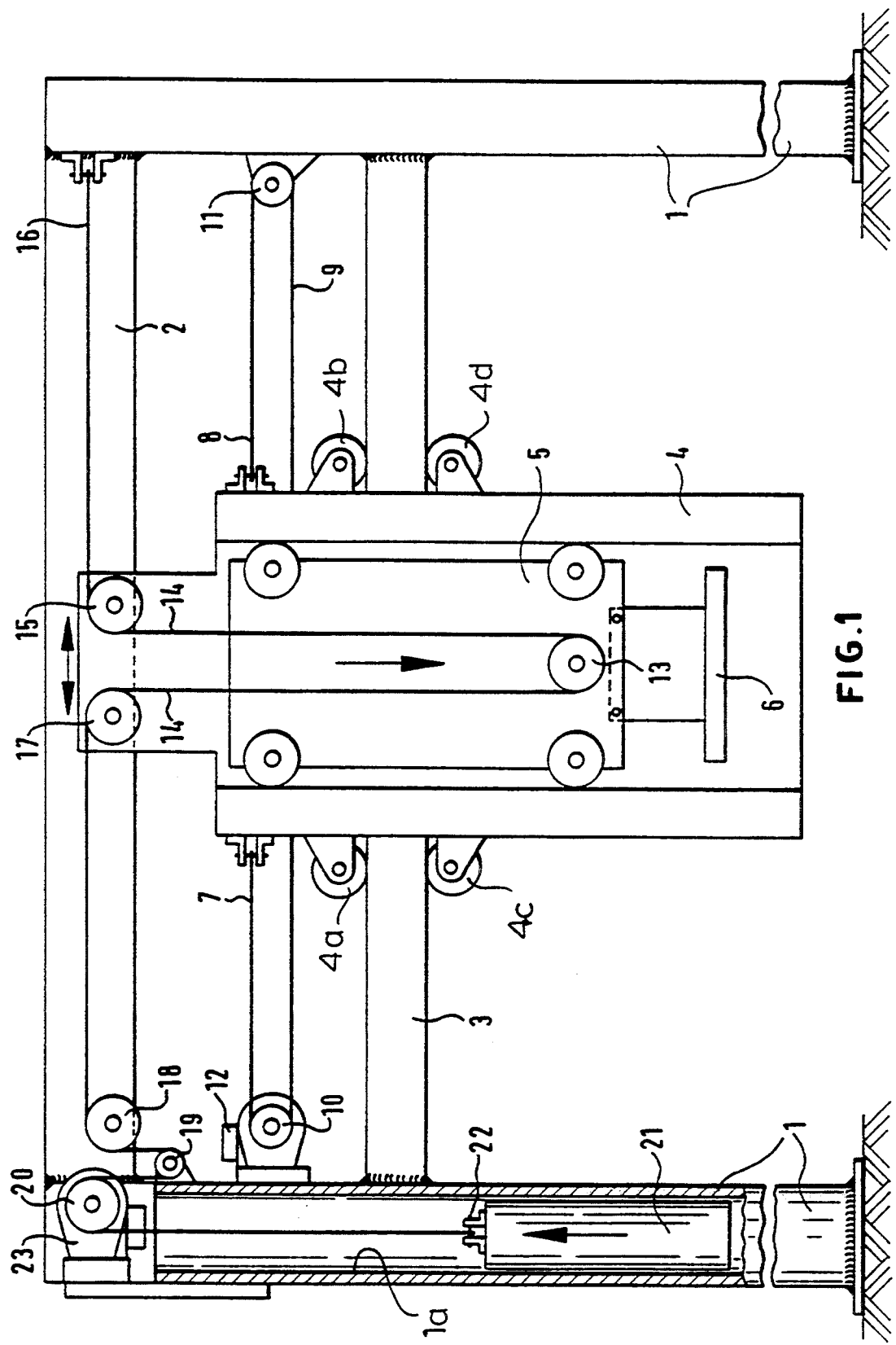
FIG. 1 is an elevational view, partly broken away, illustrating one embodiment of the invention.

As can be seen from FIG. 1, a palletizing apparatus according to the invention can comprise a frame with vertical frame members or uprights 1 and horizontal frame members, or traverses 2, 3.

On the lower traverse 3, a carriage 4 is guided for horizontal movement and, for this purpose, the carriage 4 can carry rollers 4a, 4b and 4c, 4d which engage the traverse 3 from above and below.

The carriage 4 also is provided with a lifting slide 5, referred to herein as a support member and provided at its lower end with a tool pickup head 6 on which a tool, for example to pick up a workpiece or other article or object to be stacked, is mounted. Such pickup heads and sliders are well known in the art and need no discussion here.

On both sides of the carriage 4, as represented at 7 and 8, the end of a traction element 9, e.g. a belt, are fastened. The belt 9 passes around deflecting rollers 10, 11 journaled on the uprights 1. The roller 10 on the left-hand upright is formed as a drive roller and is connected with a drive motor 12. By actuating this drive motor, therefore, the carriage can be driven horizontally along the traverse 3. The belt 9 and the roller 10 can be a cogged belt and toothed roller respectively, or can be replaced by a chain and sprocket wheel respectively.

The lifting slide 5 is provided with a deflecting roll 13 for a cogged belt 14 whose one end passes over a further roll 15 on the carriage 4 and is anchored at 16 to the right-hand upright 1.

The other end of the belt 14 is anchored at 22 to a counterweight 21 guided in a hollow la of the upright 1 at the other side of the frame, after passing over a deflecting roll 17 on the carriage 4, a further roll 18 on the traverse 2, a roll 19 which deflects the belt downwardly, and a drive roll 20 journaled on the frame and formed as a toothed roll whose teeth match the cogs of the belt. The drive roll 20 is so positioned with respect to the deflecting roll 19 and the counterweight that the belt 14 passes around the roll 20 with an arc of 180°.

The counterweight 21 is vertically movable in the left-hand upright 1 and the drive roll 20 can be driven by an electric motor or other drive represented at 23. The lifting slide 5 can thus be raised and lowered while being balanced by the counterweight 21. In horizontal movement of the carriage 4, however, the counterweight 21 does not move.

Figure 2:
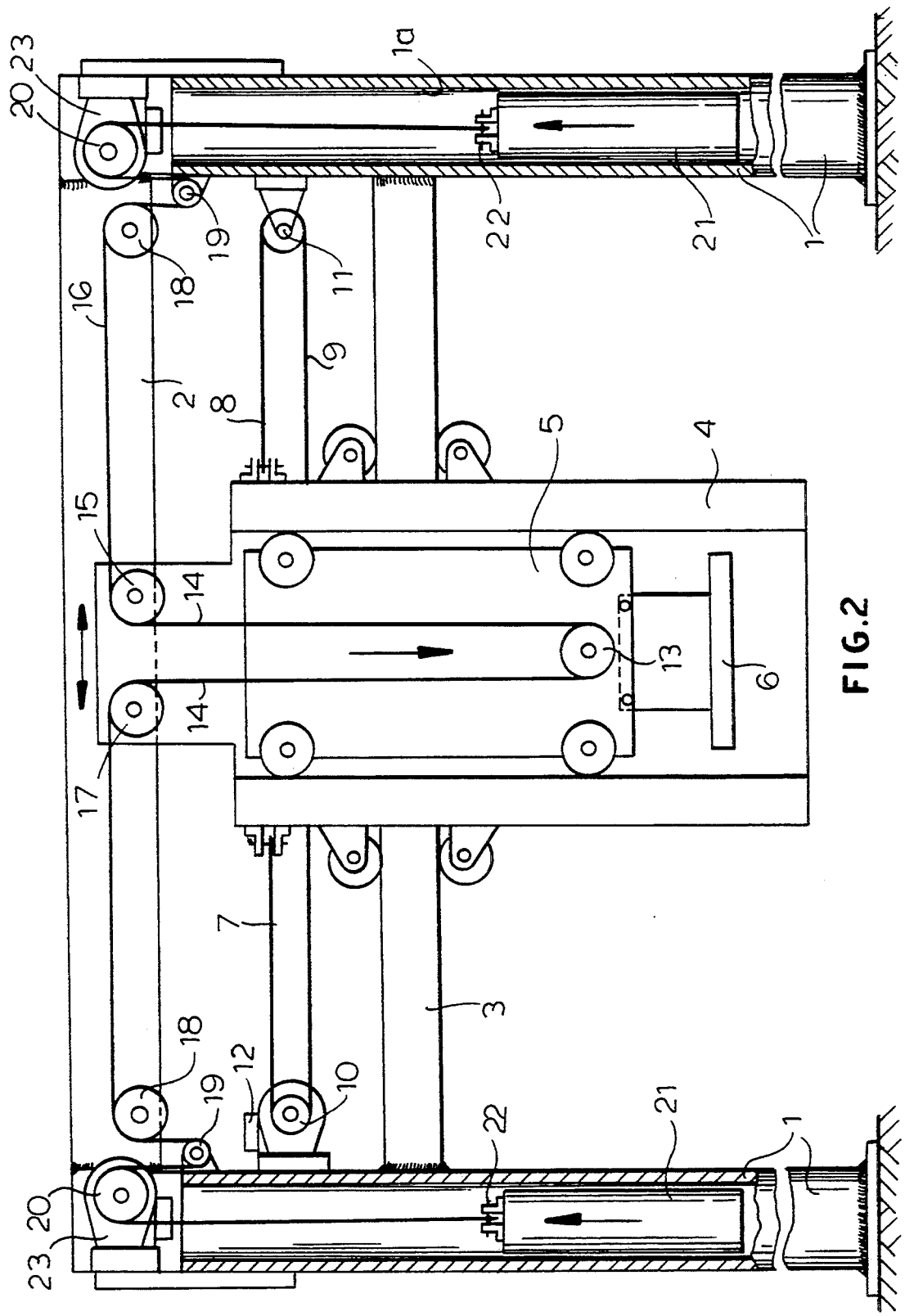
FIG. 2 is a view similar to FIG. 1 illustrating a second embodiment.

The embodiment of FIG. 2 is identical to that of FIG. 1 except that the right-hand upright 1 is also provided with a hollow 1a in which a counterweight 21 is received for vertical movement, that counterweight being anchored to the other end of the belt 14. The belt 14 then passes over a corresponding toothed wheel 20 driven by another motor 23 synchronized with the first-mentioned motor but operating in the opposite sense so that both counterweights rise as the support member 5 is lowered and descend when the support member 5 is raised. The vertical and horizontal movements for picking up, transferring and depositing workpieces on a pallet are well known in the art. In this embodiment as well, the counterweights remain stationary during horizontal movement of the carriage 4.

We claim:

1. A palletizing apparatus, comprising:
   a frame having at least one pair of uprights at opposite sides of the frame and horizontal traverses interconnecting said uprights;
   a carriage horizontally shiftable on at least one of said traverses;
   a support member vertically movable on said carriage;
   a pick-up head on said support member for picking up a palletizable article and depositing it on a pallete;
   at least one deflecting roll on said support member and a plurality of further rolls;
   a counterweight vertically guided in a hollow in one of the uprights on said frame at one of said sides;
   a traction element in the form of a cog belt anchored at one end to said counterweight and passing around said deflecting roll and said further rolls for raising and lowering said support member with compensatory lowering and raising of said counterweight, said cog belt being anchored to said frame at the other of said sides thereof, one of said further rolls being a toothed drive roll mounted at a fixed location on said frame and provided with means for displacing said element to raise and lower said support member.

2. The palletizing apparatus defined in claim 1 wherein said drive roll is so positioned that said traction element extends through 180° in passing around said drive roll.

* * * * *